J. H. Morse.
Permutation Lock.
No. 70,599. Patented Nov. 5, 1867.
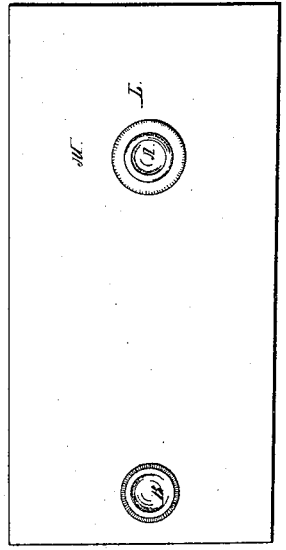
Fig. 4.
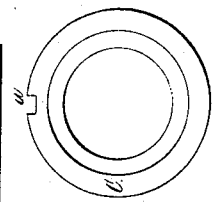
Fig. 4.
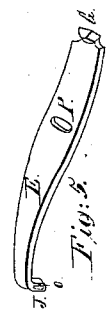
Fig. 5.
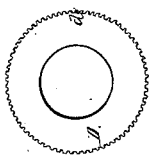
Fig. 6.
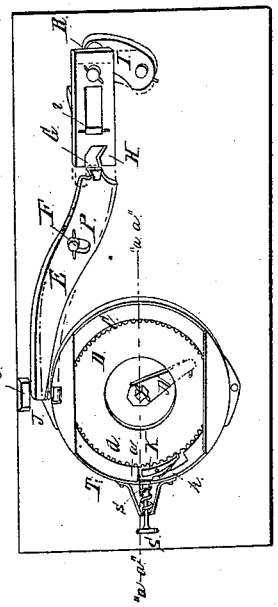
Fig. 1.
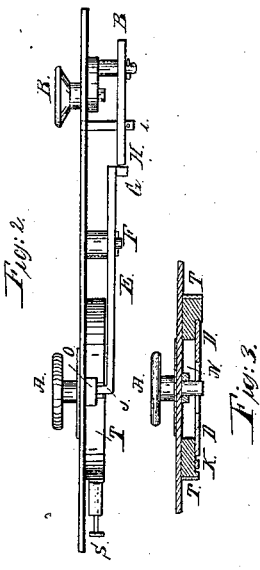
Fig. 2.
Fig. 3.

United States Patent Office.

JOHN H. MORSE, OF PEORIA, ILLINOIS.

Letters Patent No. 70,599, dated November 5, 1867; antedated October 30, 1867.

---

IMPROVEMENT IN PERMUTATION LOCKS FOR DOORS, &c.

---

*The Schedule referred to in these Letters Patent and making part of the same.*

---

TO ALL WHOM IT MAY CONCERN:

Be it known that I, JOHN H. MORSE, of Peoria, county of Peoria, and State of Illinois, have invented an Improvement in Combination Locks; and I do hereby declare that the following is a full and exact description thereof, reference being had to the accompanying drawings, and to the letters of reference marked thereon.

Figure 1 represents back view of lock, showing the internal arrangement.
Figure 2, sectional view.
Figure 3, sectional view through *a a a a*.
Figure 4, front view.
Figure 5, lug-bar, with lugs J G, rubber pad *o*, and elongated hole P.
Figure 6, hub-plate.
Figure 7, rim.

My improvement consists in the manner of making a change in the combination of figures on which the lock is set; also, in placing upon the lug that enters the slot in tumbler a rubber pad, to prevent sound in picking, and in the construction and working of lug-bar and bolt.

To construct a lock with this improvement, I place upon an arbor, or in the case T, (see fig. 1,) one or more of these tumblers or wheels, on which or in which they may revolve, or be revolved by knob A, (see fig. 4.)

To construct one of these tumblers, I take the rim of a wheel, *c*, (see fig. 7,) and in it cut a slot, *a*. Upon this rim, *c*, is the click K, with its spring, *k*. Working within this rim, *c*, (see fig. 1,) is the hub-plate D, with notches, *d*, cut on its outer edge, all around, to receive the click K. Upon the outer case T is fixed the push-pin S, with its spiral spring *s*. Upon the stud F, with an elongated hole, P, I place the lug-bar E, with its lugs, J and G. Upon the under side of lug J, where it comes in contact with rim *c*, a rubber pad, *o*, is placed, (see fig. 5.) Upon the crank I, bearing on stud *i*, I place the bolt R, with its slot H, (see fig. 1.)

To work the lock, or, when the bolt is thrown, to withdraw it, I turn the knob A once around to the right, turn on until the figure 6 on dial (the present number on which it is set) is brought under mark M on front plate, (see fig. 4;) this brings the slot *a* in rim *c* under the lug J on bar E, and allows it to drop into the slot, this end of lug-bar E being the heaviest. As the lug enters the slot, the other end of bar E is raised, (see fig. 1, dotted lines,) and the lug G is brought opposite the slot H in bolt R, allowing the bolt to be withdrawn. The lug, passing into slot H, and down the angle, raises the lug J out of slot *a* in rim *c*, and allows the tumbler to be revolved or thrown out of position. In throwing the bolt R, the knob B is turned to the left; this throws the bolt R forward by means of the crank I; this allows the lug G to pass from slot H. In passing out, the elongated hole P allows the end of lug-bar on which the lug G is placed to be raised, and, when out, to drop below the slot, and when an attempt is made to withdraw the bolt, it catches against the lug G, and is prevented from being withdrawn. Now, if pressure is applied to knob B, for the purpose of forcing lug J against the rim *c*, in an attempt to find out the slot in rim *c*, instead of bringing it down upon the rim, it forces it up against stop O.

The rubber pad *o* is placed upon lug J to prevent it being heard when the pressure is taken from knob B, and the lug J falls from stop O against the rim *c*; this prevents picking by sound.

The lock is now working on figure 6. To work it on some other figure, say 1, (the bolt being withdrawn,) turn the knob A to the right, once around, turn on until the figure 6 is brought to mark L, place your finger on push-pin S, press it into slot *a*, and against click K; this will raise click K from the notches in hub-plate, D. Turn the knob A on to the right until figure 1 is brought opposite the mark L; take off the finger, and when figure 1 is brought directly under mark M, the slot *a* will be under lug J, and the lock be in position to work.

Claim.

What I claim as my invention, and desire to secure by Letters Patent, is—

1. The push-pin S, with its spiral spring *s*, acting on click K, in combination with hub-plate D, with its notches, *d*.

2. I also claim the rubber pad *o*, or its equivalent, on lug J.

3. Also the bolt R, with its slot H and lug G on lug-bar E, all working in the manner and for the purpose specified.

JOHN H. MORSE.

Witnesses:
EDMUND THURLOW,
E. F. ROBERTS.